April 17, 1928.                O. W. HULT                1,666,384
                  METHOD OF OPERATING EXPLOSIVE ENGINES
                        Filed Feb. 28, 1923           2 Sheets-Sheet 1
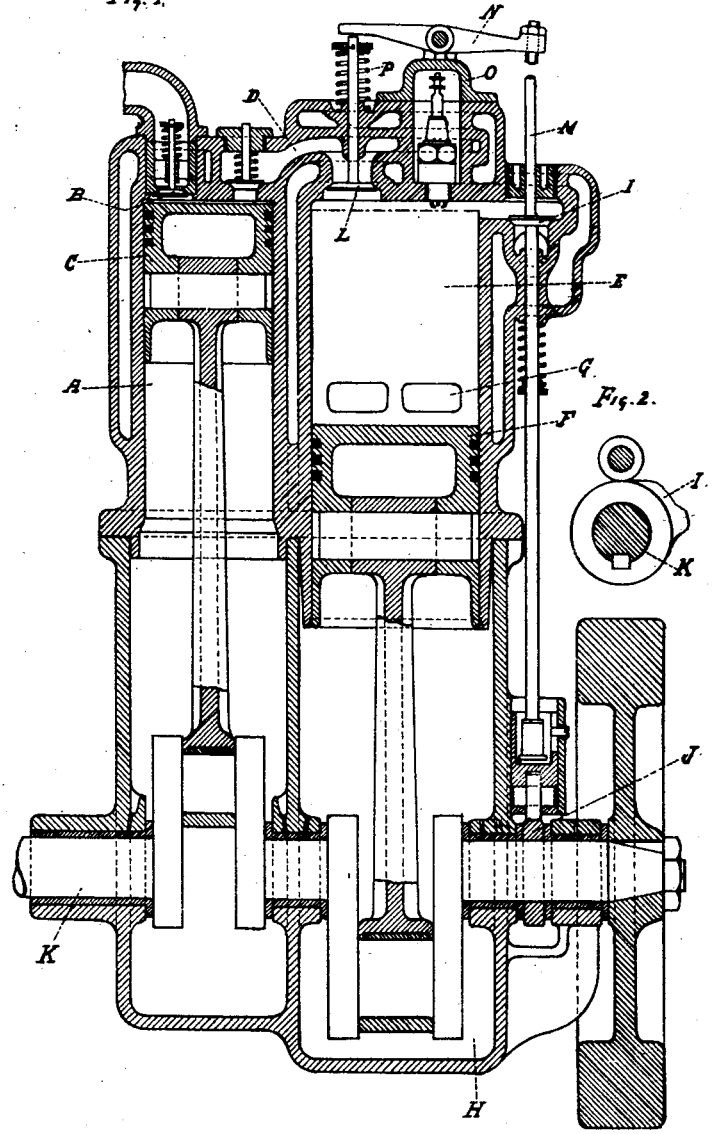
Inventor:
O. W. Hult April 17, 1928.  O. W. HULT  1,666,384
METHOD OF OPERATING EXPLOSIVE ENGINES
Filed Feb. 28, 1923   2 Sheets-Sheet 2
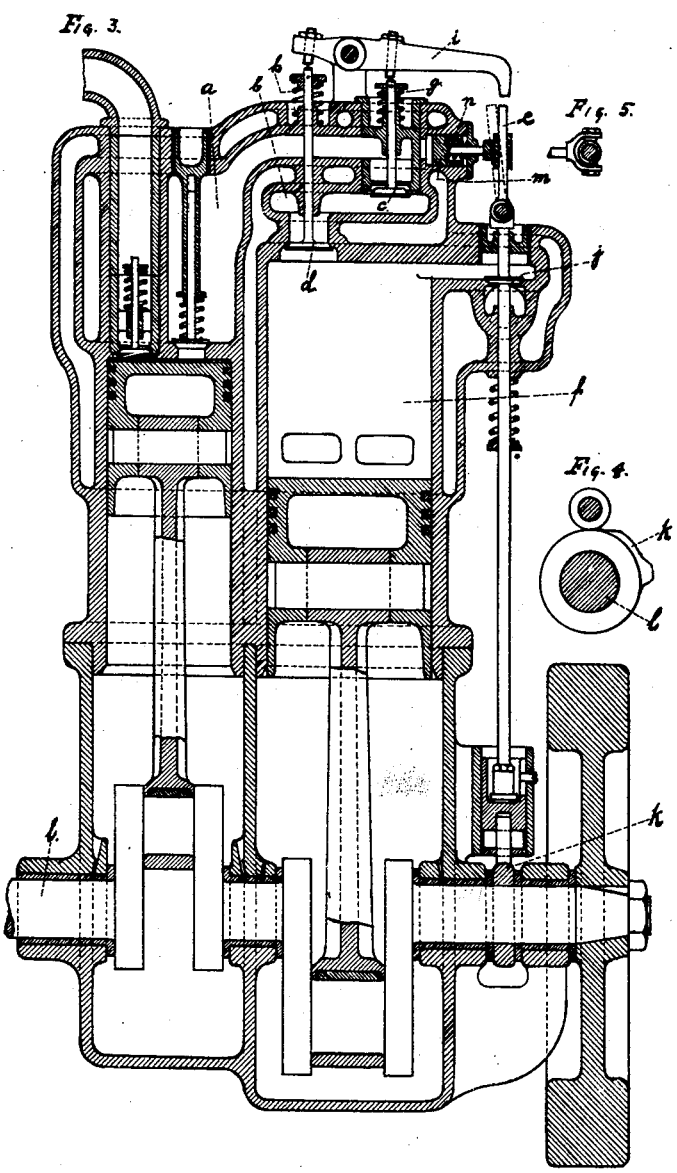

Patented Apr. 17, 1928.

1,666,384

UNITED STATES PATENT OFFICE.

OSCAR WALFRID HULT, OF STOCKHOLM, SWEDEN.

METHOD OF OPERATING EXPLOSIVE ENGINES.

Application filed February 28, 1923, Serial No. 621,919, and in Sweden March 7, 1922.

This invention has for its object the manufacture of a motor with higher efficiency relative to size and fuel consumption than the ordinary motor, and consists in an motor arranged or designed along the present principle being fed with a mixture of an initially lower temperature than the ordinary one, by the air necessary for every working-stroke being cooled before compression in the working-cylinder.

This may be attained by first compressing the air necessary for every working-stroke, and allowing it to cool, in order to afterwards expand it down to a lower pressure.

The device shown in Fig. 1 is provided with a special compressor, from which the air is pressed into a tank which is watercooled as well as the cylinder walls of the air compressor. The air is compressed to about 8 atmospheres absolute pressure, which pressure naturally should be adapted with regard to the most suitable cooling. When the air afterwards is allowed to expand by being admitted into the working-chamber with the working-piston in a proper position, the greater cooling which is a result of the expansion of the air cooled during and after compression, takes place, and this air can in the same compressed condition be kept down to a temperature of not more than $+60°$ C. or less, as a still greater cooling effect may be obtained by, e. g. compressing the air in several cylinders, from a larger to a smaller, and from the smaller into the tank.

Supposing that the air enclosed in the tank is under an absolute pressure of 8 atmospheres, and in a compressed condition has a temperature of $+60°$ centigr. $=333°$ absolute the temperature (according to a known formula) after expanding of the air to the atmospheric pressure, that is to say 5 times:

$$t = \left(\frac{1}{5}\right)0.35$$

When this mixture enters the working-cylinder where it should blend as little as possible with the hot air and the combustion residues which it is to remove, a heating process naturally takes place. But provided that it be not appreciably mixed with the air which is to be expelled (which can be avoided with the aid of devices described here below) and thus only rises as much in temperature as is a consequence of coming into contact with the hot air and the walls of the working-chamber, plus the less admixture with the expelled air which cannot be avoided, it may be assumed that this rise in temperature will not exceed 40%. The approximate temperatures before compression in the work-cylinder would then be $=189, 1,40=264°$ absolute or $-9°$ centigrade.

Through this reduction of temperature of the air or mixture, as the case may be, it is possible, e. g. in a petrol motor, to compress the mixture at least 10 times without any pre-ignition occurring. In an ordinary petrol motor pre-ignition occurs if the air impregnated with hydrocarbon is compressed more than 4,5 times. Otherwise the cooling may be adapted to the temperature most suitable for the degree of compression selected and with regard to the final temperature desired in the air or mixture respectively compressed in the working cylinder. The motor may also be equipped with a larger or smaller compressor in relation to the working-chamber of the motor, so that the air or mixture, as the case may be, expanded into the said working chamber either entirely or partly fills the same before compression.

The method will be described in connection with the accompanying drawings, in which:—

Figure 1 is a vertical sectional view of a two-cycle internal combustion engine constructed to carry out the method forming the subject-matter of the present invention.

Fig. 2 is a side view of the cam mechanism employed for operating certain of the valves of said engine.

Fig. 3 is a vertical sectional view of a four-cycle motor which operates in accordance with the improved method.

Fig. 4 is a side view of the cam mechanism used for operating certain of the valves of the engine shown in Fig. 3.

Fig. 5 is a sectional view of a detail of the mechanism shown in Fig. 3.

According to the accompanying drawings of one form of construction applied to a two-stroke motor, the process is as follows:

The air compressor A (see Fig. 1) draws in air through the valve B from the surrounding atmosphere during the downward movement of the piston C, and this volume of air is at the piston's upward movement forced into the tank D, where it is further cooled before entering the working-chamber E.

The motor shown is working on the two-stroke principle, but it is with regard to the new arrangement and to the best possible scavenging designed in the following manner: At the downward movement of the piston F, the outlet passage G is opened in the ordinary manner, so that it is uncovered after the piston F has passed about 80% of its entire stroke, after which the air, which is then compressed in the crank-case H, in the same way as in an ordinary two-stroke motor rushes into the working chamber E and expels a large portion of the remaining combustion residues. But as such scavenging is far from being complete, there is an extra outlet at the upper portion of the cylinder, provided with a valve I, which is raised by a cam J on the motor-shaft K. The movement of the valve I is so adapted that it is kept open while the piston is moving upwards about 50% of its effective stroke, after which the valve must be closed tight. But before it closes, the valve L between the receiver D and the working chamber E must be opened in plenty of time and the opening so timed that the air or mixture confined in the receiver D has time to expand into the working-chamber E, before the pressure has had time to rise appreciably in the said working-chamber. The valve L may e. g. open sufficiently so long before the closing of the valve I that the greater part of the expanding volume of the mixture in the receiver D has time to issue into the working chamber E and to expel the remaining exhaust gas before the valve L again closes; but at the same time the said closing should take place so early that the expanding mixture from the receiver D has no time to get to the valve I before it closes. The valves L and I, on the contrary, may be closed simultaneously or almost simultaneously, as the volume in the receiver D at the aforesaid closing position of the valve I should have had time to have expanded to 1 atmosphere absolute pressure, if the relation between the opening of valve L and the closing of valve I is properly timed.

The valve L obtains its movement from the same cam K (see Fig. 2) which lifts the valve I by a plunger M, that acts upon a lever N in such a manner that the valve I is first kept raised during some portion of the said return-stroke after which it is raised further so far that the plunger M acts upon the lever N which is journalled in a member O and whose opposite end is pressing against the free end of the stem of the valve L so as to open the latter. The last-mentioned valve is provided with a spring P which is sufficiently powerful to keep it tightly resting against the valve seat and to overcome the pressure in the receiver D when this pressure is greatest.

The outlet from the receiver D should be arranged in such a manner that the air or mixture, as the case may be, is directed straight downwards in the longitudinal direction of the cylinder and is spread along the piston surface, whereby the lower portion of the chamber above the piston is filled with the cold air or mixture respectively issuing from the receiver D, while the lighter and hotter air, together with the remaining combustion residues rises and is expelled from below by the colder mixture or air. By this means also the piston and the cylinder walls are cooled, and this cooling is an advantage as it takes place before the compression in the working-cylinder.

The motor may also be designed in another way, e. g. as a four-stroke motor, in which case the process described takes place in the following manner: The motor piston expels the combustion residues after an explosion-stroke, and the compressed air or mixture is admitted into the working chamber during the suction-stroke, when it expands and in this way obtains the desired lower temperature. Or the compressed air or mixture, as the case may be, may also wholly or partially be admitted into the working-cylinder during the return-stroke, while the valve is still open, as in the previously described process about the two-stroke motor shown, and this possesses the advantage of perfect scavenging being obtained according to the previously described method of allowing the fresh and cooler air during the return-stroke expel the combustion residues which at the end of the scavenging-stroke are always present in an ordinary four-stroke motor.

The motor may otherwise also be designed with gasification in the ordinary manner, so that hydrocarbon is drawn in together with the air, e. g. when the latter is being drawn with the compressor, or the fuel may also be admitted in some other manner, e. g. by means of a suction and pressure pump or the like, direct or indirect into the working-chamber. The working may also take place in various ways, e. g. by slow combustion or as in an ordinary explosion motor, and the motor may be designed for heavy or light hydrocarbons.

The advantage of the said arrangement is that a certain amount by weight of air occupies a much smaller volume, e. g. at $+25°$ centigrade than at $+125$ to $150°$ centigrade, which is the ordinary temperature of the mixture in an ordinary petrol motor at the beginning of the compression-stroke.

The result of this high temperature is that a less effective mixture is obtained plus the increased compression work for the greater volume of the same amount by weight of air which may possibly be cooled to such an extent according to the arrangement described as to occupy only half as big a volume as at the ordinary temperature prior to compression in the working cylinder. Half the piston's return-stroke may therefore be utilized for extra scavenging both in a two-stroke and in a four-stroke motor, after which the necessary air or mixture, as the case may be is admitted and fills the greater part of the remaining workingchamber immediately before the outlet valve closes, thus removing completely all combustion residues.

The gain thus arising both as regard efficiency and economy in a motor constructed according to this invention should therefore be very considerable, as it is known that, e. g. 1m³ air at +125° centigr. or 398° absolute temperature, which, estimated at a very low figure, is that common in most motors, after scavenging and in-drawing into a motor weighs 0,88 kg., while the same volume of 0° C. or 273° absolute temperature weighs 1,29 kg. or 1,45 times as much as in the former case. The consequence of this is that the lesser volume which on account of its low initial temperature when being compressed, e. g. 10 times, in so doing obtains the same final temperature as the larger volume which is compressed only 4,5 times. And as the efficiency of a mixture of air and hydrocarbon is in a certain proportional relation to the pressure at the moment of ignition, it will easily be seen that the low initial temperature is of great importance to the motor's economy and efficiency.

In motors for heavy hydrocarbons where the compression is considerably greater, the gain should be relatively the same, as 1 kg. air of e. g. 125° C. = 398 absolute temperature has a volume of 1,12 m³, while the same amount by weight at 273° absolute temperature has a volume of 0,77 m³. If both volumes are subsequently heated to, e. g. 2500° absolute temperature, while being confined each one in its vessel, adapted in conformity to the volume and the atmospheric pressure, the pressure in the former case will be $$= \frac{0.002843 \cdot 1 \cdot 2500}{1,12} = 6,32$$

atmospheres and in the case of the smaller volume $$\frac{0.002833 \cdot 1 \cdot 2500}{0,77} = 9,19 \text{ atm.}$$

From this it will be apparent that the working-pressure in a cylinder with multiple compression, when the mixture is ignited, will be of much greater average value, during the piston-stroke in a motor in which the compression can be driven considerably higher relatively to the initial volume and the volume occuring at the combustion.

This circumstance can be utilized in various ways according to the present arrangement, e. g. by increasing the quantity of cooled air, so that its volume becomes the same or nearly the same in relation to the motor cylinder as at the ordinary process in a heat motor, whereby a so much more powerful charge is obtained as the greater quantity by weight of the colder volume which is being compressed for the working-stroke.

In this manner is obtained a motor which is unusually effective in relation to the size of the working-chamber, although the efficiency is lower than if the volume which is to be compressed for the working-stroke is less, so that the expansion relation of the motive charge becomes greater or so great that the best thermic effect is attained.

The device described is carried out according to the last mentioned principle, although through thorough tests it has to be ascertained which expansion relation is the most economical one. This relation will very likely also to a certain degree be dependent upon different motive charges and upon the compression relation selected, e. g. with regard to different hydrocarbons. The temperature of the cooled air may probably with advantage be kept considerably lower than that stated in the description, whereby the efficiency becomes still greater. Through greater compression in the air receiver at the same temperature, this lower temperature can easily be obtained, as the increased expenditure of power in the compressor is mostly compensated by the lesser volume which subsequently need to be compressed in the working cylinder of the motor and which at the combustion produces a better result on account of its greater capacity of expansion.

The compressor may have a lower speed than the motor, its volume being increased in a corresponding degree as well as the volume of the receiver from which the air or mixture in some suitable manner is distributed so that the working-chamber of the motor gets the proper quantity for every working-stroke.

The arrangement shown in Figs. 3 to 5 is a form of development of the form of construction shown in Figs. 1 and 2 in the case of a motor where the air is cooled by first being compressed in a special receiver, after which it is allowed to expand to a lower pressure, by which process it is cooled. The new arrangement consists in the receiver being constructed in such a manner as to hold a larger quantity of air, e. g. 10 times more than the quantity to be admitted into the motor cylinder before every working-stroke and so that only so large a portion of the said quantity is admitted before every such working-stroke that the quantity for every working-stroke becomes the same or approximately the same.

The receiver (see Fig. 3) is divided into two compartments $a$ and $b$ which communicate with each other, while the compressor is forcing the air into the same, whereby the pressure becomes alike in both compartments, e. g. 5 atmospheres absolute pressure, if the pressure from the beginning is one atmosphere. When the pressure is thus 5 atmospheres in both compartments $a$ and $b$, the valve $c$ between them closes, and at the same time the valve $d$ is opened by the plunger $e$ so that the greater part of the volume in the compartment $b$ expands into the working-chamber $f$ in order to form at the proper time that volume or a portion of it, which is to be compressed for the next working-stroke.

The springs $g$ and $h$ are so adapted that the valves $c$ and $d$ do not open under the higher pressure in the compartments $a$ and $b$, and at the same time the spring $h$ must be so much stronger than the spring $g$ that the first mentioned spring with the aid of the lever $i$ keeps the valve $c$ open when the valve $d$ is closed. When subsequently the lever $i$ is raised at its outer end by the plunger $e$, the valve $c$ is closed and the valve $d$ opened, so that only that quantity which is in the compartment $b$ can expand into the working-chamber $f$, after which the valve $d$ is again closed and the valve $c$ is opened.

The movement of the valve $d$ is so much longer than that of the valve $c$ that the latter is not actuated or opened, until the former has passed a part of its closing-stroke, and this relative movement of the valves is adapted in such a manner that the valve $d$ has time to close before the air or mixture coming from the compartment $a$ has had time to pass the compartment $b$ to the valve $d$. Should, however, a small portion of the said mixture has had time to force its way into the working-chamber $f$ before the valve $d$ is closed, this will be utilized at the next working-stroke, and if this circumstance would be repeated before every compression-stroke, it does not matter, if the relation of volumes between the compartments $a$ and $b$ is adapted in such a manner that only the desired quantity has time to get into the working-chamber $f$ before every compression-stroke.

The plunger $e$ is connected with the outlet-valve $j$ of the working-chamber $f$ and gets its movement from the member $k$ on the motor shaft $l$.

In connection with the compartment $a$ there is a small pressure-piston $m$ whose duty is it to automatically put the plunger $e$ into function, so that it opens the valve $d$, after the desired air pressure in the receiver or the compartments $a$ and $b$ has been reached.

When the piston $m$ on account of the pressure, e. g. of 5 atmospheres absolute, occupies its outer position, the plunger $e$ acts upon the lever $i$ in such a manner, that the latter opens the valve $d$, whereby the previously described process occurs.

If the pressure in the receiver is too low, the piston $m$ is forced back by a spring $n$, and this spring must be adjusted in such a manner that it does not overcome that pressure in the compartment $a$ which arises when the valve $d$ is opened and the valve $e$ is closed, after the average pressure in the compartment $a$ has become normal through the action of the compressor.

The device for automatically opening the valve $d$ after the desired pressure has been reached, has been made with regard thereto that a motor which at every revolution may utilize only, e. g. one fifth of the volume of air in the receiver or the compartments $a$ and $b$ when being started, e. g. the first time, must revolve so many times that the desired pressure is reached in the receiver ere the air commences to leave the same. The receiver which in this case is as large as the stroke-volume of the compressor must therefore receive as large a quantity of air or mixture of certain temperature as five times the compressor's stroke-volume, before the pressure reaches 5 atm. absolute. Once this pressure has been reached, the requisite addition takes place at every revolution of the motor, if the latter is a two-stroke one, as in the form of construction shown. If the motor is a four-stroke one, the requisite addition during two revolutions of the motor, takes place for a working-stroke, when the compartment $b$ is opened once for that volume which the motor consumes at every working-stroke. The compressor may then be smaller, so that the desired volume appropriate to every working-stroke of the motor is always in the compartment $b$, when the valve $d$ is opened, or be geared down in such a manner that it makes one compression for a corresponding working-stroke of the motor. But the easiest and simplest way is to drive the compressor direct from the motor-shaft.

Through the present arrangement the air or mixture, as the case may be, gets so much more time for its cooling as the relation between the total volume of the two compartments $a$ and $b$ and that of the smaller chamber $b$, which in the form of construction described is only one fifth of the entire compressed volume. The time for cooling is thus prolonged 5 times, if the relation is 1 to 5, and 10 times, if the relation is. e. g. 1 to 10 between the large compartment $a$ and the small chamber $b$. By this arrangement there is thus in the last mentioned case 10 times so long a cooling time for the air or mixture, as the case may be, relatively to the speed of the motor.

The whole thing may be carried out in various ways and adapted to two- or four-stroke motors, or any other system whatsoever.

The compressor may be adapted so as to serve simultaneously several working-cylinders obtaining their charge from several small receivers, which in the indicated manner are in connection with the large receiver.

The receiver or compartment *a* may be larger or smaller in relation to compartment *b*, and the motor may e. g. work in the ordinary way, before the cooling device begins to operate, which, e. g. when a motor is started without the requisite pressure in the receiver, cannot take place until the compressor has been in operation during the number of revolutions necessary for the said pressure. This pressure, however, remains between each time the motor is running, provided the valves are quite tight and the whole is so arranged that no appreciable leakage can occur.

The connecting up of the movement of valves *c* and *d* may also be done by hand, after the desired pressure in the receiver or the compartments *a* and *b* has been attained.

The receiver may also consist of one compartment and the valve movement be so adapted that only as large an amount is allowed to pass out each time into the working chamber *f* as is suitable for the next working-stroke.

The air enclosed in the said receiver may also be utilized for self-starting of the motor, in which case the compressor is disconnected, e. g. by keeping the suction valve open, whilst the motor is starting up, which must then take place independent of the charge which otherwise is driven in from the receiver, the motor for a few revolutions then obtaining its mixture in the ordinary manner.

Having now described my invention, what I claim as new and desire to secure by Letters Patent is:

1. The method of operating an internal combustion engine, in which the working stroke is followed by an exhaust stroke and a charge stroke, which comprises compressing a combustible fluid, cooling said compressed combustible fluid, expanding a given volume of said compressed and cooled fluid while performing work and thereby cooling the fluid further, compressing the cooled and expanded fluid and using the fluid thus obtained for developing power under explosion in the working cylinder of said engine.

2. The method of operating an internal combustion engine, in which the working stroke is followed by an exhaust stroke and a charge stroke, which comprises compressing a combustible fluid, cooling said compressed fluid, expanding a given volume of said compressed and cooled combustible fluid while performing work and thereby cooling the fluid further, compressing the cooled and expanded fluid in the working cylinder of said engine and using the combustible fluid thus obtained for developing power under explosion in said cylinder.

3. The method of operating an internal combustion engine, in which the working stroke is followed by an exhaust stroke and a charge stroke, which comprises compressing a combustible fluid, cooling said compressed fluid, introducing a given volume of said compressed and cooled fluid into the working cylinder of said engine, expanding said volume in said cylinder while performing work and thereby cooling the combustible fluid further, compressing the expanded and cooled fluid in said cylinder and using the fluid thus obtained for developing power under explosion in said cylinder.

4. The method of operating an internal combustion engine in which the working stroke is followed by an exhaust stroke and a charge stroke which comprises compressing air, cooling said compressed air, expanding a given volume of said compressed and cooled air together with a combustible fluid while performing work and thereby cooling the air further, compressing the mixture, thus obtained, in the working cylinder of said engine and bringing the mixture to explosion in said cylinder.

5. The method of operating an internal combustion engine in which the working stroke is followed by an exhaust stroke and a charge stroke which comprises compressing air, cooling said compressed air, introducing a given volume of said compressed and cooled air into the working cylinder of said engine, expanding said volume in said cylinder together with a combustible fluid while performing work and thereby cooling the air further, compressing the mixture thus obtained in said cylinder and bringing the compressed mixture to explosion in said cylinder.

6. The method of operating an internal combustion engine, in which the working stroke is followed by an exhaust stroke and a charge stroke, which comprises compressing a mixture of air and a combustible fluid, cooling said compressed mixture, introducing a given volume of said compressed and cooled mixture in the working cylinder of said engine, expanding said volume in said cylinder while performing work and thereby cooling the mixture further, compressing the expanded and cooled mixture in said cylinder higher and bringing the mixture thus obtained to explosion in said cylinder.

7. The method of operating an internal combustion engine, in which the working stroke is followed by an exhaust stroke and a charge stroke, which comprises introducing into the working cylinder of the engine during a first portion of the charge stroke, which stroke corresponds to a suction stroke in other motors, a compressed and cooled mixture of air and a combustible fluid and expanding said mixture in said cylinder during the remaining portion of said stroke while performing work and thereby cooling the mixture.

In witness whereof I have hereunto set my hand.

OSCAR WALFRID HULT.